United States Patent [19]

Hegner et al.

[11] 4,420,792

[45] Dec. 13, 1983

[54] PLUG-IN CONNECTOR WITH ARRESTERS FOR SEPARATING BLOCKS

[75] Inventors: Gunter Hegner; Hermann Herfort, both of Berlin, Fed. Rep. of Germany

[73] Assignee: Krone GmbH, Berlin, Fed. Rep. of Germany

[21] Appl. No.: 278,046

[22] Filed: Jun. 29, 1981

[30] Foreign Application Priority Data

Apr. 4, 1981 [DE] Fed. Rep. of Germany ....... 3113759

[51] Int. Cl.[3] .............................................. H02B 1/10

[52] U.S. Cl. ...................................... 361/331; 337/34; 361/119; 361/357

[58] Field of Search ............... 361/331, 332, 347, 349, 361/357, 360, 430, 119, 341, 356; 337/18, 28, 31, 32, 33, 34

[56] References Cited

U.S. PATENT DOCUMENTS

| | | | |
|---|---|---|---|
| 3,254,181 | 5/1966 | Lemieux | 337/18 X |
| 3,886,408 | 5/1975 | Klayum et al. | 361/119 X |
| 4,133,019 | 1/1979 | Roach et al. | 337/34 X |

FOREIGN PATENT DOCUMENTS

| | | | |
|---|---|---|---|
| 792356 | 8/1968 | Canada | 337/34 |
| 1196281 | 7/1965 | Fed. Rep. of Germany . | |
| 1929845 | 12/1970 | Fed. Rep. of Germany . | |
| 2428266 | 12/1975 | Fed. Rep. of Germany . | |
| 2555394 | 6/1976 | Fed. Rep. of Germany . | |
| 507599 | 6/1971 | Switzerland . | |

*Primary Examiner*—G. P. Tolin
*Attorney, Agent, or Firm*—Brown & Martin

[57] ABSTRACT

The subject-matter of the present invention is a plug-in connector with arresters (1) for separating blocks, comprising a cartridge-type housing (20) of insulating material having receptacles for the arresters (1), each of said arresters being connected through a respective fuse element (11) and an earth contact (3) to an earth strip (7) and being exchangeably retained within the receptacle by means of compression springs (10). In order to obtain a number of advantages with respect to manufacture and operation, such as simple construction and inexpensive manufacture as well as easy manipulation and suitability for two respective tapping contacts per arrester, in the plug-in connector according to the invention the arresters (1) each comprise three electrodes (12, 12′, 12″) each of which is connected to a contact pin (c, b, a) both mechanically and electrically. The contact pins (c, b, a) engage into clamping contacts (2, 3, 4), the two outer ones (2, 4) of which are connected each to a tapping contact (5, 6) accessible from the outside and the central clamping contact (3) of which is connected to the U-shaped earth strip (7). The fuse element (11) associated with each arrester and being in the form of a solder pellet is disposed between the central electrode (12) and an earth bar (8) accessible from outside and electrically and mechanically connected to the earth strip (7). The compression spring assemblies for the arresters (1), which assemblies (10) are accessible through openings (9) formed in the housing, comprise electrical contacts (17, 18) which are associated to the outer electrodes (12′, 12″) of the arresters (1) but which will make an electrical contact only after the solder pellet has melted.

12 Claims, 2 Drawing Figures

PLUG-IN CONNECTOR WITH ARRESTERS FOR SEPARATING BLOCKS

Figure 1:
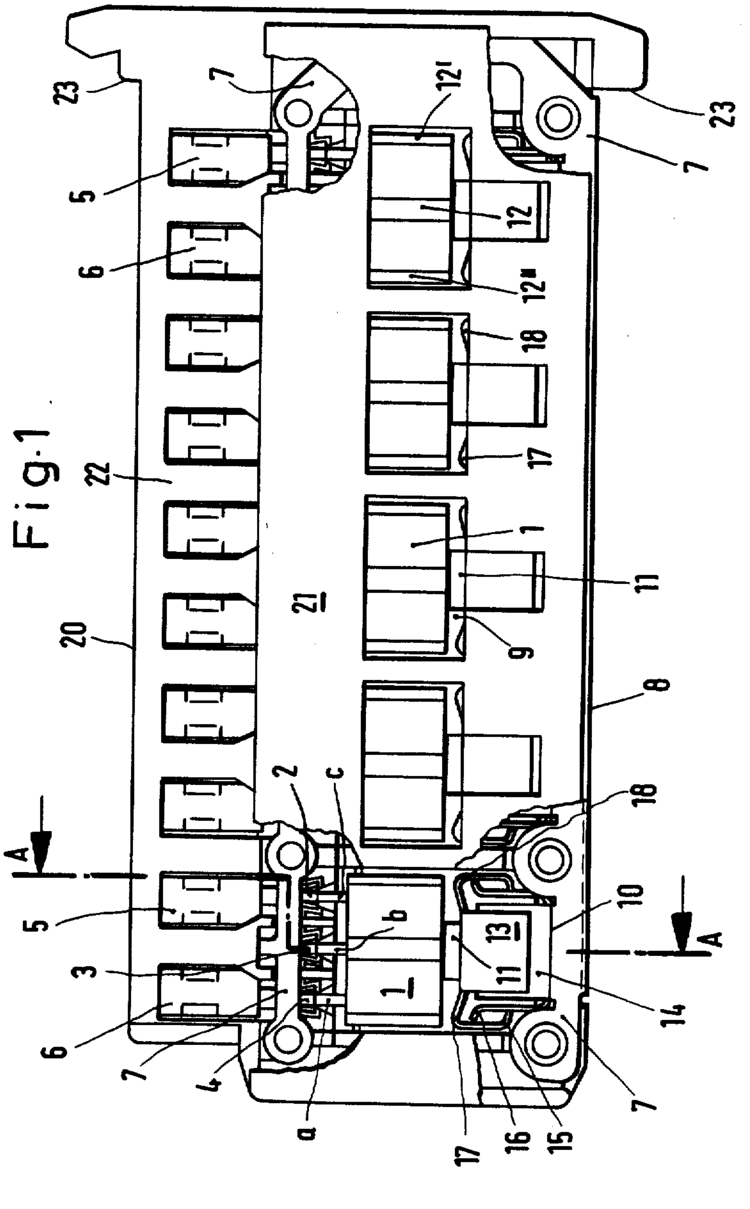

The present invention relates to a plug-in connector with arresters for separating blocks, comprising a cartridge-type housing of insulating material including receptacles for the arresters, each of which arresters is connected through a respective fuse element and an earth contact to a common earth strip and is exchangeably retained within the housing receptacles by means of compression springs.

To protect the various functional parts, for example of telecommunication distributing facilities, from excess currents, particularly from commercial alternating currents, so-called arresters in the form of plug-in cartridges or connectors are employed which in the case of an excess current of longer duration will connect the conductors to ground potential due to fusing or melting of a fuse element.

Such a plug-in connector with arresters of the species mentioned above is described in the Applicant's DAS No. 2,428,266 and comprises a double-shell plastics housing in which ten recesses are formed so as to extend in two rows offset against one another. Each recess is adapted to accommodate an arrester manually inserted from outside. Retaining of the respective arresters within the housing recess is effected by means of a compression-spring assembly, wherein a compression spring disposed within a dish-like bulging portion of the housing urges a tapping contact disposed within the housing so as to be longitudinally slidable towards an end face of the cylindrical arrester. Under the action of the spring pressure the arrester is supported via a fuse element by an earth contact which is a bent extension integral with a continuous common earth strip.

This known plug-in connector has been widely accepted because it is inexpensive to manufacture and easily manipulated. But like other known devices, e.g. according to the DOS No. 1,929,845, the DOS No. 2,555,394, German Patent Specification No. 1,196,281, and the Swiss Patent Specification No. 507,599, this known plug-in connector cannot be used in combination with so-called two-way arresters each of which replaces two conventional arresters.

It is the object of the present invention to provide a plug-in connector with arresters, e.g. for separating blocks, of the species mentioned above, which plug-in connector permits the use of two-way arresters.

In accordance with the present invention this object is solved in that each of the arresters includes three electrodes each of which is connected to a contact pin, that the contact pins engage into clamping contacts the two outer ones of which are connected each to a tapping contact accessible from the outside and the central clamping contact being connected to the U-shaped earth strip, that the fuse element in the form of a solder pellet is disposed between the central electrode and an earth bar facing outwardly and being electrically and mechanically connected to the earth strip, and that the compression spring assemblies for resiliently retaining the arresters, which assemblies are accessible via openings formed in the housing, comprise electrical contacts associated with the respective outer electrodes of the arresters.

In accordance with a suitable further development of the present invention the respective compression spring assemblies consist of two telescopically guided cup-shaped metal housing halves between which a spreader element in the form of a compression spring is received. The contact elements in the form of laterally protruding resilient bands are attached to the upper cup-shaped metal housing half, and under the action of the spring the solder pellet rests against the outer surface of this metal housing half. The lower metal housing half is supported on a support surface of the earth bar.

Figure 2:
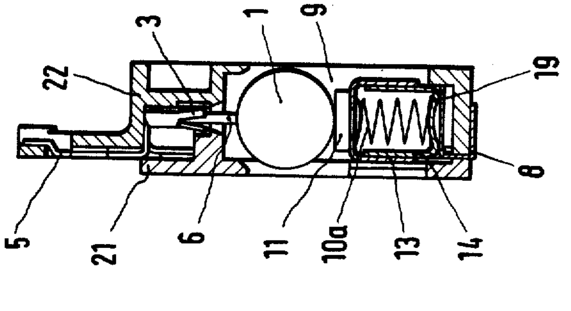

An embodiment of the invention will now be described below with reference to the accompanying drawing, in which:

FIG. 1 is a plan view, partially in section, of a plug-in connector including five inserted arresters, and FIG. 2 is a sectional view along the line A—A of the plug-in connector shown in FIG. 1.

As will be apparent from FIG. 1 the plastic housing 20 of the plug-in connector is formed with five apertures 9 extending in a row in side-by-side relationship, and in each of said apertures there is disposed a respective two-way arrester or, respectively, a three-electrode arrester 1. Each arrester 1 is provided with three contact pins c, b, a, which are inserted longitudinally into a respective one of clamping terminals 2, 3, 4 formed by longitudinally directed resilient tabs. The two lateral contact pins c and a are electrically connected to lateral electrodes 12′, 12″, and the central contact pin b is electrically connected to a central electrode 12 of the respective arrester 1.

The two outer clamping terminals 2, 4 adapted to receive the contact pins c, a are electrically and mechanically connected to outwardly extending tapping contacts 5, 6 adapted to be connected to the respective contact elements of the separator block.

The central contact pin b engages the central clamping terminal 3 which—together with a further central clamping terminal 3 for the remaining two-way arresters 1—is connected to a continuously extending common earth strip.

As will be apparent from FIG. 1, the earth strip 7 is U-shaped, wherein the two parallel legs of the U extend within the plastic housing over approximately the entire length thereof and the lower leg (as seen in FIG. 1) is formed as an outwardly protruding earth return bar 8.

Each of the two-way arresters 1 is retained within the plastic housing 20 by means of a compression spring assembly 10, a solder pellet 11 being secured between said spring assembly 10 and the lower surface (as seen in the figure) of the two-way arrester.

The compression spring assembly 10 comprises two metal housing halves 13, 14 which are formed as telescope-like cups and by means of a compression spring disposed in the interior thereof are movable relative to each other. The maximum spreading of the compression spring assembly 10 obtainable by the compression spring 10*a* is limited by stop hooks 15, 16 which are attached at either of the two housing halves 13, 14 and are adapted to interengage (cf. the left-hand portion of FIG. 1).

Opposite to each of the two outer or lateral electrodes 12′, 12″ of the two-way arresters 1 and at a predetermined intermediate spacing which is slightly smaller than the height of the solder pellet 11 there are disposed two respective contact elements 17, 18 which may be formed as separate spring elements or as a portion of the stop hooks 15, 16 and which are electrically and mechanically fixedly connected to the upper metal housing half 13 of the compression spring assembly 10.

The earth return bar 8 comprises a support 19 on which the lower metal housing half 14 is supported in direct contact therewith.

The plastic housing 20 consists of the actual housing 22 on which a plastic lid 21 has been fixed in a single operation e.g. by ultrasonic welding.

As is apparent from the right-hand portion of FIG. 1, stops 23 are integrally formed with one end of the housing part 22, which stops limit the insertion depth of the strip.

In case of an excess current of longer duration the solder pellet 11 mounted on the upper surface of the upper metal housing 13 will melt whereby the contact bridges 18, 17 will be brought into conductive engagement with the electrodes 12', 12'' and will thus, together with the central electrode, be short-circuited via the electrically conductive compression spring assembly with the grounded earth bar.

In the case of an excess current of short duration of current will flow from the tapping contact 5 or 6, respectively, via the electrodes 12' or 12'', respectively, to the central electrode 12. Between the electrodes 12, 12', 12'' there is provided a gas which with increasing voltage will be ionized and form an arc and will thus become conductive. From the central electrode 12 the current will flow via the solder pellet 11 to the earth bar. If this condition continues for some time the solder pellet 11 will melt, thus short-circuiting all three electrodes 12, 12' and 12'' and preventing both damage to the arresters as well as other dangers.

The current may flow to the earth return bar via two paths, viz. on the one hand—this being the main path—via the tapping contacts 5, 6, the short-circuited path from the respective outer electrode 12' and, respectively, 12'' through the central electrode 12 to the earth return bar, and on the other hand from the respective tapping contact 5 or 6, respectively, via the associated outer electrode 12' or 12'', respectively, direct to the earth return bar. This two-way discharge will considerably improve the reliability.

We claim:

1. A plug-in connector with a plurality of arresters for separating blocks, said connector comprising:

- a cartridge-type housing made of insulating material, said housing being elongated and formed with a like plurality of said openings therethrough, said openings being adjacent one another in linear spaced arrangement;
- a group of three friction-type electrical clamping contacts adjacent each said side opening in said housing;
- a U-shaped earth strip substantially longitudinally coextensive with said housing, one longitudinal side of said earth strip comprising an earth bar positioned along one edge of said housing, the opposite longitudinal side of said earth strip being positioned on the opposite side of said side openings whereby said side openings are positioned within the open part of the U of said earth strip;
- a plurality of externally accessible tapping contacts in spaced adjacent relationship along the opposite longitudinal edge of said housing, two of said clamping contacts in each group being connected individually to two of said tapping contacts adjacent thereto, another one of said clamping contacts in each group being connected to said earth strip;
- three spaced electrodes formed on each said arrester;
- a contact pin extending from each said arrester electrode, all three said contact pins being in spaced substantially parallel relationship;
- said contact pins of one said arrester being pluggably and removably received by said clamping contacts in each said group, said arrester being removably externally accessible through said side openings, first and second ones of said electrodes being connected to respective said tapping contacts;
- a compression spring assembly removably mounted between each said arrester and said earth bar;
- a meltably fuse element positioned between said spring assembly and the third electrode of said arrester;
- said spring assembly normally making electrical and mechanical contact between said earth bar and said third electrode through said fuse element and constantly biasing said arrester toward the plugged position, said third electrode being further connected to said earth strip by means of one of said contact pins said another one of said clamping contacts when said arrester is in the plugged position; and
- a pair of electrical contacts fixed on opposite sides of said spring assembly and normally spaced from said first and second electrodes respectively.

2. The plug-in connector recited in claim 1 wherein said compression spring assembly comprises two metal housing halves movable relative to each other by means of a compression spring positioned between said housing halves.

3. The plug-in connector recited in claim 2 wherein said metal housing halves are formed with stop hooks to prevent said halves from moving apart beyond a predetermind distance.

4. The plug-in connector recited in claim 2 wherein said electrical contacts are integrally formed on the metal housing half more closely adjacent said arrester.

5. The plug-in connector recited in claim 3 wherein said electrical contacts are integrally formed on the metal housing half more closely adjacent said arrester.

6. The plug-in connector recited in claim 1 wherein there are five said side openings in said housing and five said arresters arranged in side-by-side relationship in said openings, each said arrester being plugged into its respective group of clamping contacts.

7. The plug-in connector recited in claim 2 wherein there are five said side openings in said housing and five said arresters arranged in side-by-side relationship in said openings, each said arrester being plugged into its respective group of clamping contacts.

8. The plug-in connector recited in claim 1 wherein said earth bar is formed with a support face for each said compression spring assembly.

9. The plug-in connector recited in claim 2 wherein said earth bar is formed with a support face for each said compression spring assembly.

10. The plug-in connector recited in claim 2 wherein during normal operation of said connector said compression spring biases one metal housing half against said fuse element and in turn against said third electrode of said arrester.

11. The plug-in connector recited in claim 1 wherein said earth strip and said earth bar form an integral metal member wherein the two legs of the U-shaped earth strip extend in parallel relationship to one another over substantially the entire length of said plug-in connector on opposite sides of said side openings.

12. The plug-in connector recited in claim 1 wherein said electrical contacts are spaced from their respective first and second electrodes by a distance which is less than the thickness of said fuse element, whereby upon melting of said fuse element said electrical contacts engage said first and second electrodes.

* * * * *